Patented Feb. 4, 1941

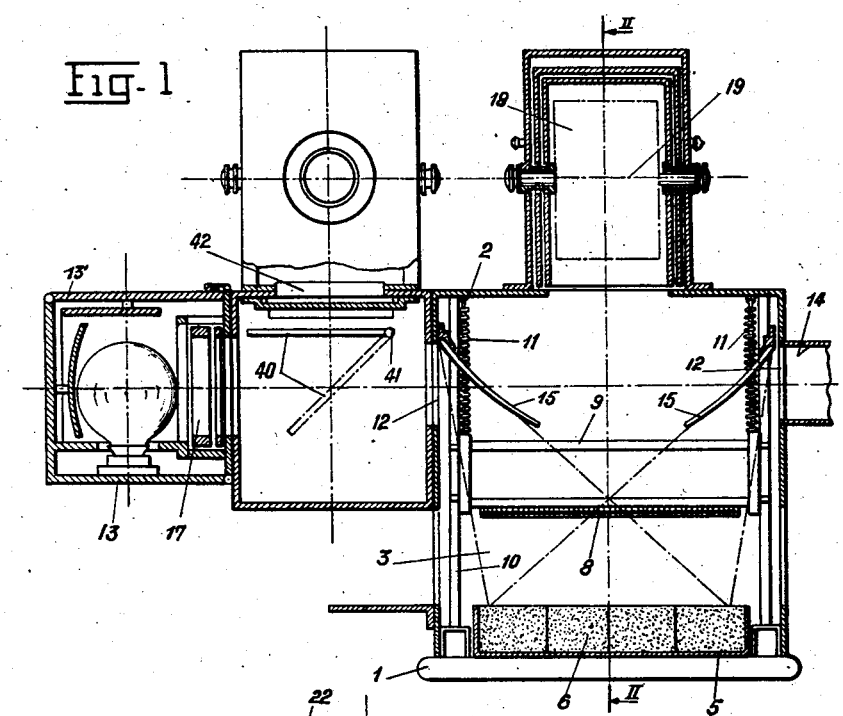
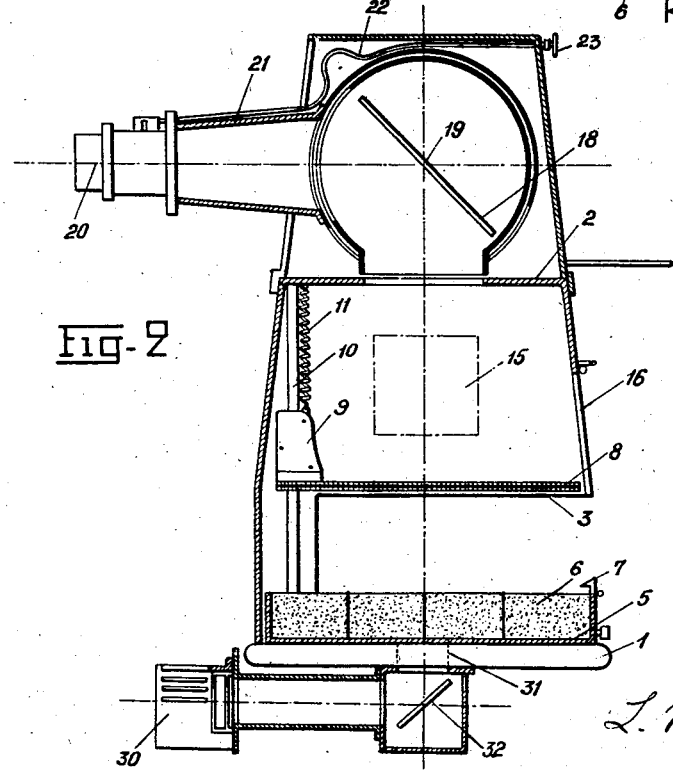

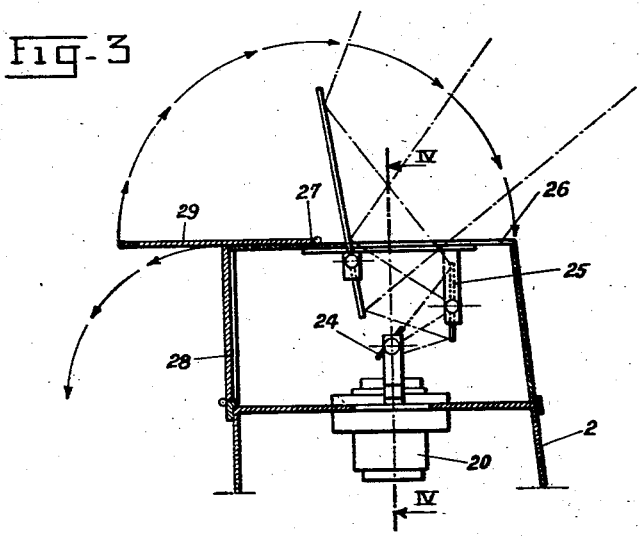
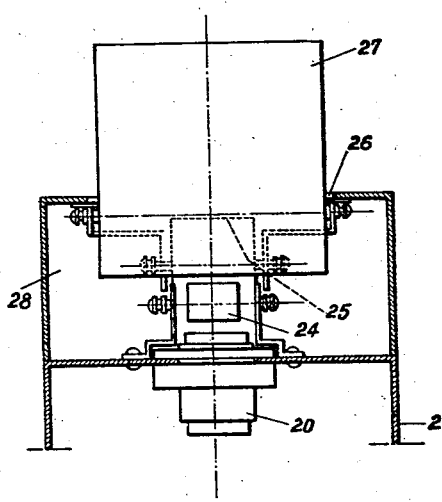
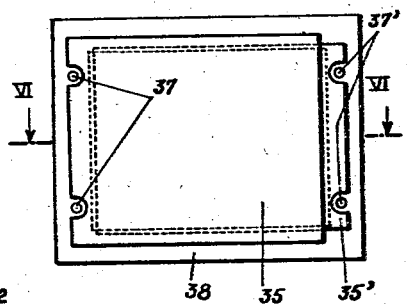
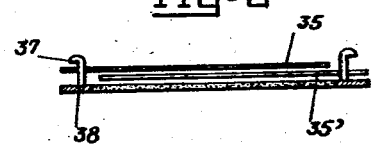
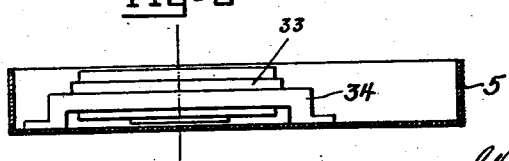

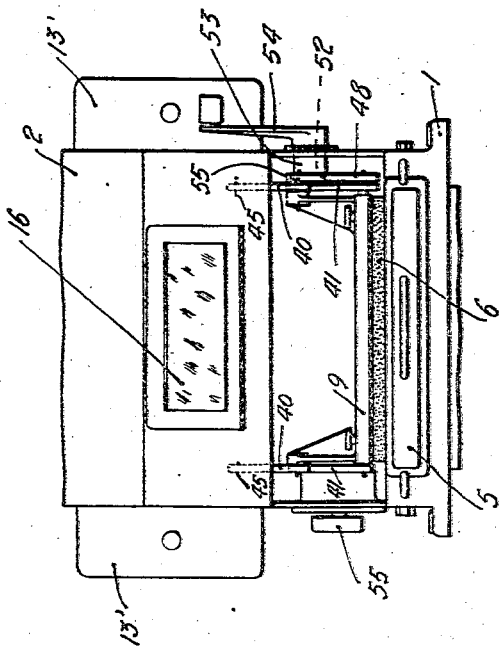
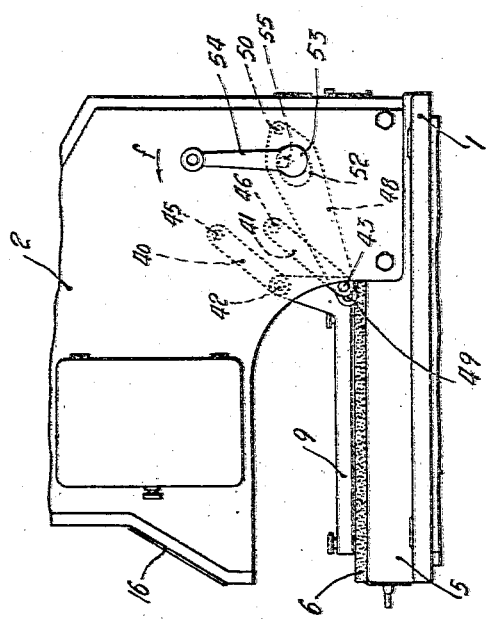

2,230,572

UNITED STATES PATENT OFFICE 2,230,572

PROJECTION APPARATUS

Louis Nicolas Mestre, Paris, France, assignor to Anciens Etablissements Barbier, Benard & Turenne, Paris, France, a French company Application December 20, 1937, Serial No. 180,905
In Luxemburg December 22, 1936

7 Claims. (Cl. 88—24)

My invention relates to an improved optical projection apparatus more particularly adapted to the episcopic projection and has for its main object to facilitate the work of the operator and to improve the quality of the projection, and for this purpose, the element to be projected is supported horizontally, has plenty of clearance room and remains constantly accessible and visible to the operator during the projection.

A series of particular characteristic arrangements of the projection apparatus relates to the operating field which comprises a horizontal space within a case supporting the optical devices as a whole and the side wall of which is provided at its lower part with an opening which extends along a part of the periphery of its bottom plate so as to leave a sufficient space for the operator to pass his hands, a shutter being optionally provided on the closed side of said space to enable documents or preparations to be slipped in.

A wall of the frame, a part of which is preferably pivotally mounted so as to increase still further the possibility of access to the operating field, has a transparent portion which constantly ensures the operator a normal visibility of the field and enables him to place in position the elements to be projected and to manipulate same during the projection.

The said bottom plate may carry either an object-carrier for the purpose of episcopic projection, or a transparent frame carrying a condenser, a water tank or the like, and permitting of the diascopic projection of elements of large area which are illuminated by transparency by means of a reflector located below the operating field and receiving the luminous flux through the intermediary of mirrors or the like.

The aforesaid object-carrier and frame are preferably movable and may have the shape of slides or be pivotally mounted, so that either of them can be used with the same apparatus, it being possible preferably to bring the episcopic and diascopic illuminating systems into operation simultaneously for the projection of living animals, glass basins or the like.

A further series of particular characteristic arrangements relates to the object-carrier of which the bottom is lined with one or a plurality of elements made of cellular rubber or the like on which the objects to be projected are applied by a movable frame preferably sliding in a guide-way carried by the frame and co-operating with a stop adapted to lock same in an invariable position. Said stop defines the position of the surface to be projected and it is thus possible to compensate the differences of thickness existing between the objects to be projected. Said frame, when lifted by any appropriate means, releases said object and it can carry a plate of glass, trellis or grating, or the like.

The objective is arranged before or after the mirrors and an oscillating support may be provided carrying two or more objectives of different focal lengths, and particularly a group of two objecitves, one of which corresponds to a small field with a high magnification and the other to a large field with less considerable magnification.

Other features and objects of my invention will moreover become apparent from the ensuing description made with reference to the accompanying drawings which are given solely by way of example and in which:

Fig. 1 is a sectional elevation of the combination of a diascopic apparatus with an apparatus more particularly intended for episcopic projection;

Fig. 2 is a section along the line II—II of Fig. 1 of the apparatus more particularly intended for episcopic projection;

Fig. 3 is a partial section similar to Fig. 2 of a modification of the episcope-diascope apparatus;

Fig. 4 is a section along the line IV—IV of Fig. 3;

Fig. 5 is a sectional elevation of a frame with a condenser;

Figs. 6 and 7 show respectively in section along the line VI—VI of Fig. 7 and in plan view, a device for transparent objects;

Figs. 8 and 9 are respectively partial front and side views of a modification.

According to the embodiment shown in Figs. 1 and 2, the apparatus comprises a horizontal supporting plate 1 forming the bottom of a casing 2. The side wall of said casing 2 is provided at its lower part with an opening which extends along a part of the periphery of said plate 1 above which is thus formed an empty space 3 which is readily accessible to the operator and wherein he can pass his hand to slide the documents or preparations.

On said base 1 rests an object-carrier slide 5 provided with cellular rubber elements 6 on which are placed the objects to be episcopically projected. Said slide 5 carries a hook 7 adapted to hold stationary the frame 9 of a levelling glass or grating 8, substantially on coming into contact with the upper surface of the rubber 6, said frame 9 being slidably mounted along vertical guides 10. Springs 11 interposed between the frame 9 and the upper part of the frame 2 urge said frame 9 upwards so as to lift same when it is released by the hook 7, it being possible moreover to control such lifting by means of a lever or a pedal.

Openings 12 are provided in the side wall of the base 1 so as to allow the luminous beam or beams from laterally arranged lamps to pass. Only one of these lamps 13 has been shown lodged in a housing 13' and the luminous beam it produces passes through a condenser and water tank unit 17, as known, before reaching the opening 12. A similar lamp, not shown, is carried by the tube 14 fixed on the opposite face of the frame, and such fixing can be effected by means of a bayonet system or the like enabling said lamp to be fixed on another face of the frame. The luminous beams penetrating through the openings 12 are reflected on the preparation-carrier by mirrors 15 of appropriate shape.

It is obvious that one or a plurality of lamps can thus be utilized simultaneously according to the luminous intensity desired, each lamp co-operating with a mirror such as 15.

The casing 2 includes above the base 1 a transparent coloured glass 16 mounted on hinges and enabling the operating field to be observed. Said plate 16 is preferably made of glass which absorbs infra-red rays.

At the upper part of the casing 2 is placed the optical projection system formed by the combination of a reflector 18 of which the position is adjustable by rotation about a pin 19 and by an objective 20 carried by a support 21 which is orientable about the same pin 19. The focussing of the objective is effected by a remote control 22 and a knob 23.

It will be understood that this arrangement enables any object to be placed in position for projection, even when such object projects beyond the sides of the slide 5, and that said object will always be arranged in a suitable manner relatively to the optical system owing to the glass 8 of which the operative position is definitely fixed and is invariable with respect to said optical system.

There has furthermore been shown in Fig. 1 an apparatus for diascopic projection fixed on the frame 2 between this latter and the lamp 13. As this apparatus does not operate at the same time as the apparatus already described, it can utilize the luminous beam of the same source 13, which beam is deviated by the retractable mirror 40 brought into the operative position shown in chain dotted lines by rotation about the pivot 41. The transparent element to be projected is arranged above the opening 42 and the other members of the apparatus can be similar to those of the apparatus already described.

A modification of this optical projection system is shown in Figs. 3 and 4. According to this latter example, the objective 20 has its optical axis vertical; it receives directly the luminous rays emitted by the element to be projected and sends same on to a first orientable mirror 24 which co-operates with another orientable mirror 25 which itself sends the luminous rays, through the opening 26, on to a third orientable mirror 27. It is thus possible to effect a projection on a very close screen.

A swinging shutter 28 enables an aperture of the frame 2 to be opened through which the projection is effected by means of the mirror 25, the mirror 27 being eliminated and the opening 26 closed by the shutter 29.

To enable the above described apparatus to be utilized for diascopic projection (Fig. 2), an illumination comprising a lantern 30 arranged laterally relatively to the frame and/or at a distance, produces a luminous beam which is directed vertically by means of an orientable mirror 32 through an opening 31 provided in the base 1.

For this use, the slide 5 shown in Fig. 5. The bottom of said slide 5 is provided with a support 34 for a condenser 33, and it is thus possible to project transparent elements or the like of large dimensions.

The slide 5 shown in Fig. 5 cooperates moreover advantageously with the device shown in Figs. 6 and 7 and permitting the projection of diagrams and plans 35, 35' which can be in several colours and co-operate with coloured projection screens. As said diagrams or the like complete each other by superposition, they can be effected on supports made of flexible transparent material such as Cellophane, etc. Each of said supports has perforations 36 which can be open and are intended to be fitted onto two pairs of projections 37 fixed on two opposite sides of the frame 38, two supports 35 and 35' being each fitted, as shown, on a different pair, the support 35 on the projections 37 and the support 35' on the projections 37'.

Referring to Figs. 8 and 9, the apparatus has been shown, as in Figs. 1 and 2, resting off-set on a base 1 and of which the frame 2 has a glass 16 allowing the operating field to be seen and which is inclined relatively to the horizontal to permit of a better visibility.

The frame 9 carrying the glass 8 similar to the one described above, instead of being slidably mounted, is carried on either side by two levers of equal length 40 and 41 pivoted on said frame by two pivots 42 and 43 and on the frame 2 by pivots 45 and 46. The control of the displacement of said frame 9 and the locking of same is effected by a lever 48 which has at one end a slot 49 on which slides an extension of the pivot 43 and which is pivoted at its other end on a pivot 50 carried by the frame 2.

Adjacent this latter pivot, the lever 48 has a slot 52 in which is lodged a cylindrical extension 53 of a crank 54 which is outside the frame and mounted on this latter by a pivot 55 of which the axis is different from that of said cylindrical extension.

It will be understood, under these conditions, that the rotation of the crank 54 in the direction of the arrow f causes the lever 48 to rotate in the direction in which it lifts the frame 9 which is again brought into and locked in its operative position by rotating the crank 54 in the opposite direction.

In Fig. 8 there has furthermore been the two housings 13' enclosing illuminating lamps and which can be controlled by a switch knob 53 within reach of the operator's hand.

Of course, my invention is in no way limited to the embodiments illustrated and described which have only been given by way of example, it will be obvious that various changes may be made without departing from my invention and I therefore aim in the appended claims to cover all such changes and modifications as fall within the true spirit and scope of my invention.

What I claim is:

1. In an optical projection apparatus including a body, a holder for an opaque object, a lighting system adapted to illuminate said holder, and an optical device arranged in operative relation to said holder and lighting system, said holder for an opaque object comprising a bottom plate, a resilient means covering said bottom plate for supporting said object, the thickness of said mass above said bottom plate being substantially equal to the height of the object to be projected, a transparent plate, a frame carrying said plate, means carried by said body for movably supporting said frame whereby said latter is adapted to be displaced between a working position in which said plate bears substantially on the upper surface of said mass and a rest position in which said plate is above said surface.

2. An optical apparatus as claimed in claim 1 wherein said frame is slidingly supported by said body and including a hook carried by said holder and adapted to lock said frame in its working position.

3. An optical apparatus as claimed in claim 1 wherein the means for supporting said frame includes jointed members pivoted both to said frame and said body, and a manually operable control lever pivoted to said frame and operatively connected to said members.

4. An object holder for an optical projection apparatus consisting of a drawer provided with a bottom plate, a resilient mass covering said bottom plate the thickness of said mass above said bottom plate being substantially equal to the height of the object to be projected.

5. A transparent object holder for an optical projection apparatus including a frame having four sides, at least two pairs of projections carried by two opposite sides of said frame respectively, a plurality of superposed transparent plane objects each of which is provided with two holes fitted onto one of said two pairs of projections, two superposed of said objects being fitted onto said two pairs respectively.

6. In an apparatus for optical projection comprising a horizontal supporting plate the upper surface of which is adapted to support the element to be projected, a casing of which the bottom is formed by said supporting plate and inside which said surface is located and which includes a side wall, said side wall being provided on the one hand at the lower part thereof with an opening which extends along a part of the periphery of said supporting plate and the height of which is at least equal to the mean thickness of the human hand, and on the other hand, above said opening, at least one transparent portion arranged so as to enable the element to be projected to be seen.

7. An apparatus for optical projection as claimed in claim 6 in which said side wall includes above said opening an inclined part arranged in face of a part of said bottom plate, said transparent portion being included in said inclined part.

LOUIS NICOLAS MESTRE.